United States Patent [19]

Kitahara et al.

[11] 4,452,864
[45] Jun. 5, 1984

[54] MAGNETIC RECORDING MEDIUM

[75] Inventors: Yoshimi Kitahara; Kazumasa Fukuda; Fumio Maruta, all of Tokyo, Japan

[73] Assignee: TDK Electronics Co., Ltd., Tokyo, Japan

[21] Appl. No.: 418,610

[22] Filed: Sep. 16, 1982

[30] Foreign Application Priority Data

Dec. 4, 1981 [JP] Japan ................... 56-194400

[51] Int. Cl.$^3$ ............................................. H01F 1/00
[52] U.S. Cl. .................................... 428/611; 428/336; 428/457; 428/656; 428/694; 428/900; 428/928
[58] Field of Search ........................ 427/127–132, 427/48; 204/192 M; 428/900, 928, 336, 611, 694, 656, 457

[56] References Cited

U.S. PATENT DOCUMENTS 4,277,809  7/1981  Fisher ........................ 360/131

OTHER PUBLICATIONS

Kobayashi et al., J. Appl. Phys. 52 (3), 3-81, pp. 2453-2455.

Primary Examiner—Bernard D. Pianalto
Attorney, Agent, or Firm—Oblon, Fisher, Spivak, McClelland & Maier

[57] ABSTRACT

A magnetic recording medium comprises a substrate and a magnetic recording layer formed on the substrate and having an easy magnetization axis in the perpendicular direction to the surface of the medium, characterized in that said magnetic recording layer is composed of from 75 to 90% by weight of Co, at most 15% by weight of Mo and the rest being V and unavoidable impurities.

8 Claims, 1 Drawing Figure

MAGNETIC RECORDING MEDIUM

BACKGROUND OF THE INVENTION

1. FIELD OF THE INVENTION

The present invention relates to a magnetic recording medium, and more particularly to a perpendicularly magnetizable magnetic recording medium for super high density recording.

2. DESCRIPTION OF THE PRIOR ART

Extensive researches are being made by various circles on the perpendicularly magnetizable magnetic recording system as a prospective system for super high density recording expected to be commercially available in near future. In the conventional magnetic recording media, magnetic recording is conducted in such a manner that a magnetic layer formed on a substrate is magnetized in a horizontal direction of the magnetic layer (i.e. in-plane magnetization). When the recording density is increased in the horizontal magnetization recording, the diamagnetic field of the magnetic layer increases, which in turn leads to a reduction and rotation of the residual magnetization and consequently the reproducing output will considerably be decreased. Thus, there is a practical limitation in the increase of the recording density. Under the circumstances, a perpendicular magnetization recording system in which magnetization is conducted in a direction perpendicular to the surface of the magnetic layer (i.e. in a direction of the thickness of the magnetic layer), has been proposed as a system which breaks through the limitation in the increase of the recording density of the horizontal magnetization recording system. In the perpendicular magnetization recording, the shorter the wave length of the recording signals is i.e. the greater the recording density is, the smaller the demagnetization field becomes. Accordingly, the perpendicular magnetization recording system is expected to be more advantageous for the high density recording than the horizontal magnetization recording system.

As a recording medium useful for such a perpendicular magnetization recording system, a Co-Cr layer formed by a sputtering method has already been proposed as being extremely effective. The sputtering method is well known as one of the methods for the preparation of thin magnetic metal layers, in which when glow discharge is conducted in a vacuumed inert gas atmosphere, the gas ions are driven to collide with the cathode (i.e. the target) to evaporate the cathode material in a form of atoms or groups of atoms and the sputtered metal atoms are deposited on the surface of the substrate disposed close to the anode.

The present inventors have conducted researches on this Co-Cr layer with a view to its practical applications and mass production, and during the course of the researches, they have realized that there are some practical problems involved. Namely, firstly, when a high speed layer-forming operation is carried out by means of a sputtering device, the coercive force (Hc ($\perp$)) tends to be so great that no adequate overwrite characteristic is thereby obtainable in the actual digital recording, and secondly, the coercive force (Hc ($\perp$)) is highly dependent on the temperature of the substrate at the time of the layer-forming operation, and accordingly if the layer-forming operation is continuously carried out for mass production, the substrate temperature is unavoidably varied by the radiation heat from the target and the coercive force (Hc ($\perp$)) is correspondingly changed, whereby it becomes impossible to form a layer having a uniform quality.

Firstly, the overwrite characteristic must be at least 26 dB. To obtain the overwrite characteristic of such a level, the coercive force (Hc ($\perp$)) must be at most 600 Oe. In the case of the Co-Cr layer, when the layer-forming operation is conducted at a low deposition speed (i.e. less than several hundreds Å/min) in an experimental laboratory scale, it is possible to obtain a coercive force (Hc ($\perp$)) of less than 600 Oe by properly cooling the substrate. However, in an industrially feasible high speed layer-forming operation where the deposition speed is several thousands Å/min. the coercive force inevitably becomes to be at least 600 Oe, and in an extremely case, it reaches a level as high as 1,800 Oe. Thus, in the case of the Co-Cr layer, it is practically impossible to obtain an adequate overwrite characteristic for actual digital recording at a production speed feasible for an industrial operation.

Secondly, with respect to the dependency of the coercive force (Hc $\perp$)) on the substrate temperature, it has been found that in the case of Co-Cr layer, the coercive force increases with an increase of the substrate temperature at a rate of at least 30 Oe/10° C. The substrate is heated mainly by the radiation heat from the target, and in the case of continuous production, it is expected that the substrate temperature changes at every moment and it is impossible to obtain a layer having a uniform characteristic so long as the dependency of the coercive force on the substrate temperature is so great as mentioned above.

In this technical field, there has been an attempt to incorporate a third component such as rhodium to the Co-Cr system, but the above mentioned problems have not thereby been solved.

SUMMARY OF THE INVENTION

It is an object of the present invention to overcome the above mentioned problems and to provide a perpendicularly magnetizable superior magnetic recording medium for super high density magnetic recording which is useful particularly for practical applications and mass production.

Cobalt has a great crystal anisotropic energy and is considered to be a basic element to form a perpendicularly magnetizable magnetic layer by virtue of its hexagonal system crystal structure. The present inventors have conducted an extensive research on cobalt alloys and as a result have found that a Co-Mo-V alloy is suitable for the purpose of the present invention.

The present invention provides a magnetic recording medium comprising a substrate and a magnetic recording layer formed on the substrate and having an easy magnetization axis in the perpendicular direction to the surface of the recording medium, wherein the magnetic recording layer is composed of from 75 to 90% by weight of Co, at most 15% by weight of Mo and the rest being V and unavoidable impurities. A high magnetic permeability layer may be interposed between the substrate and the magnetic recording layer.

Now the present invention will be described in further detail with reference to preferred embodiments.

BRIEF DESCRIPTION OF THE FIGURE

The FIGURE is a graph illustrating the dependency on the substrate temperature of the magnetic properties of the perpendicularly magnetizable magnetic recording layer of the present invention and the conventional perpendicularly magnetizable magnetic recording layer.

DETAILED DESCRIPTION OF THE PREFERRED EMBODIMENTS

Figure 1:
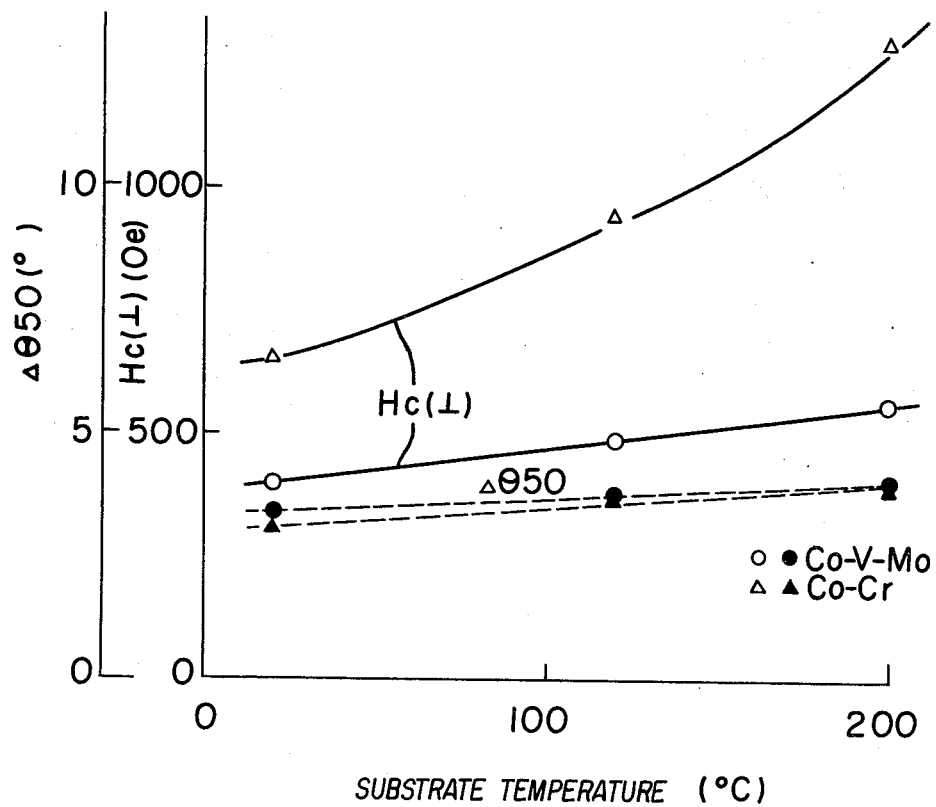

In the Co-V-Mo layer of the present invention, the half value width $\Delta\theta$ 50 of a X-ray reflection rocking curve from (002) plane, which is the most important parameter for a perpendicularly magnetizable magnetic recording medium, is within 5° which is equal to that of the Co-Cr layer. This X-ray reflection rocking curve represents the degree of the dispersion of C-axis of the crystal structure of the layer. Further, the coercive force (Hc ($\perp$)) which is decisive to an adequate overwrite characteristic for digital recording, can also be controlled within a range of at most 600 Oe, preferably from 300 to 600 Oe by adjusting the amount of Mo added. Furthermore, the rate of increase of the coercive force (Hc ($\perp$)) with an increase of the substrate temperature can be suppressed at a level of at most 10 Oe/10° C. which is ½ or less of the corresponding rate in the case of Co-Cr layer. Thus, in the continuous layer-forming operation, the variation of the coercive force dependent on the change of the substrate temperature by the radiation heat from the target can substantially be reduced as compared with the case of the Co-Cr layer.

In the Co-Mo-V layer of the present invention, Co is required to be present in an amount of from 75 to 95% by weight as the basic element to form a crystal structure having a great crystal anisotropy necessary for the formation of a perpendicularly magnetizable magnetic medium. If the amount is less than 75% by weight, no adequate perpendicular magnetization is obtainable. On the other hand, if the amount exceeds 95% by weight, the saturated magnetization tends to be too high. The rest of from 5 to 25% by weight is composed of Mo and V. When only V is incorporated, the saturated magnetization (Ms) will be lowered, the h.c.p. structure will be stabilized and the anisotropic magnetic field (Hk) will satisfy the requirement of $Hk > 4\pi Ms$ as in the case of Cr in the Co-Cr layer. However, the perpendicular coercive force tends to be too low and the half value width of the rocking curve tends to be widened. With the addition of Mo thereto, the former will be within a range of from 300 to 600 Oe and the latter will be within a range of from 2.8° to 3.4° and thus it is thereby possible to obtain the desired layer. Even when Mo is added in a small amount, it exhibits the effectiveness corresponding to the amount. However, if the amount of Mo exceeds 15%, the coercive force (Hc ($\perp$)) tends to gradually decrease. Therefore, Mo is used in an amount of at most 15% by weight, and the coercive force (Hc ($\perp$)) can optionally be controlled by adjusting the amount of Mo added. The rest is composed of V and unavoidable impurities. The amount of V is preferably from 6 to 16% by weight and the amount of Mo is preferably from 3 to 15% by weight. The respective amounts are optionally selected depending upon the particular process conditions to obtain the desired layer properties.

The magnetic recording layer, i.e. the Co-Mo-V layer, has preferably a thickness of from 0.05 to 3 microns.

The magnetic recording medium of the present invention may be prepared by means of a sputtering device in such a manner that with use of a target having a predetermined composition, sputtering is made on a substrate of e.g. polyimide under optional sputtering conditions. A magnetron type sputtering device may advantageously be used to prevent an increase of the substrate temperature.

Further, it has already been proposed to line the perpendicularly magnetizable magnetic recording layer with a high magnetic permeability layer (Japanese Unexamined Patent Publication No. 51804/79), whereby the perpendicular magnetization recording can efficiently be made by a monopolar type head without using an auxiliary magnetic pole. In the present invention, such a high magnetic permeability layer may be interposed between the substrate and the perpendicularly magnetizable magnetic layer. As such a high magnetic permeability layer, there may be used, for instance, a Mo-Fe-Ni alloy.

The substrate may be made of any material which is commonly used for the magnetic recording media. Preferred materials for the substrate include polymers such as polyester, polyimide, and polyamide.

Now the invention will be described in further detail with reference to the Examples.

EXAMPLES 1 TO 6

By means of a high speed sputtering device, layer-forming operations were conducted by varying the proportions of the components of the Co-V-Mo layers. The coercive forces (Hc ($\perp$)) and the half valve widths ($\Delta\theta 50$) of the layers thereby obtained were measured. The sputtering conditions were as follows:

Ar gas pressure: $8.0 \times 10^{-3}$ Torr
Input electric power: from 3 to 5 kW
Distance between the electrodes: 100 mm.
The results thereby obtained are shown in Table 1.

COMPARATIVE EXAMPLES 1 AND 2

Co-V and Co-Cr layers were formed in the same manner as in Examples 1 to 6. The coercive forces (Hc ($\perp$)) and the half value widths ($\Delta\sigma 50$) of the layers were measured, and the results thereby obtained are shown in Table 1.

TABLE 1

| Examples | Composition (wt. %) | Deposition speed (Å/min) | $\Delta\theta 50$ (degree) | Hc ($\perp$) (Oe) |
|---|---|---|---|---|
| 1 | Co-16V-3Mo | 5200 | 3.4 | 350 |
| 2 | Co-14V-6Mo | 5100 | 3.2 | 420 |
| 3 | Co-14V-9Mo | 5120 | 2.9 | 580 |
| 4 | Co-8V-10Mo | 5250 | 2.8 | 520 |
| 5 | Co-6V-12Mo | 5000 | 3.0 | 450 |
| 6 | Co-6V-15Mo | 5200 | 3.2 | 400 |
| Comparative Example 1 | Co-18V | 5100 | 3.8 | 200 |
| Comparative Example 2 | Co-20Cr | 5000 | 3.2 | 1120 |

From the results shown in Table 1, it is seen that the Co-V-Mo layers of the present invention have a coercive force (Hc ($\perp$)) of less than 600 Oe whereby an adequate overwrite characteristic is obtainable, even when they were prepared at a high layer-forming speed suitable for an industrial operation. Further, it is seen that the coercive force (Hc ($\perp$)) can optionally be controlled within a range of from 300 to 600 Oe by adjusting the amount of Mo added.

Now, the dependency of the magnetic properties of the layers on the temperature of the respective substrates is shown in Table 2 and the FIGURE of the attached drawing. The layer-forming speed (i.e. the deposition speed) was 5,200 Å/min.

TABLE 2

| Substrate temperature (°C.) | | 20 | 120 | 200 |
| --- | --- | --- | --- | --- |
| Co-16V-3Mo | Hc (⊥) (Oe) | 400 | 490 | 570 |
| | Δθ50 (°) | 3.4 | 3.8 | 4.0 |
| Co-18Cr | Hc (⊥) (Oe) | 680 | 950 | 1350 |
| | Δθ50 (°) | 3.2 | 3.8 | 3.9 |

It is seen from the above results that in the case of the Co-V-Mo layer of the present invention, even when the substrate temperature is raised from 20° C. to 200° C., the coercive force (Hc (⊥)) increases merely by 170 Oe, and the dependency of the coercive force on the temperature is as small as 10 Oe/10° C. This proves that the change in the magnetic properties of the Co-V-Mo layer of the present invention is extremely small even when the substrate temperature was varied by the radiation heat from the target during the continuous production, and thus the Co-V-Mo layer of the present invention is suitable for mass production.

Whereas, in the case of the Co-Cr layer, the coercive force (Hc (⊥)) exceeds 600 Oe even when cooled with water. Not only that it is thereby impossible to obtain an adequate overwrite characteristic but also the layer shows a strong dependency on the substrate temperature. Namely, when the substrate temperature is raised from 20° C. to 200° C., the coercive force (Hc (⊥)) increases by 670 Oe. Thus, the increasing rate of the coercive force is as high as 36 Oe/10° C., i.e. at least 3 times the increasing rate in the case of the Co-V-Mo layer of the present invention.

Having thus described the present invention, it should be understood that the present invention presents a novel Co-V-Mo perpendicularly magnetizable magnetic recording layer whereby the problems inherent to the conventional Co-Cr layer concerning the overwrite characteristic at the time of digital recording and the dependency of the coercive force on the substrate temperature, have been solved. The perpendicularly magnetizable magnetic recording layer of the present invention is suitable for mass production on an industrial scale. Thus, the present invention contributes to a great extent to the field of super high density recording which is expected to be developed in future.

We claim:

1. A magnetic recording medium comprising a substrate and a magnetic recording layer formed on the substrate and having an easy magnetization axis in the perpendicular direction to the surface of the medium, characterized in that said magnetic recording layer is composed of from 75 to 90% by weight of Co, the remainder being comprised of both Mo and V but wherein Mo is limited to a maximum of 15 weight percent on the bases of the magnetic layer and unavoidable impurities.

2. A magnetic recording medium comprising a substrate, a high magnetic permeability layer formed on the substrate and a magnetic recording layer formed on the high magnetic permeability layer and having an easy magnetization axis in the perpendicular direction to the surface of the medium, characterized in that said magnetic recording layer is composed of from 75 to 90% by weight of Co, at most 15% by weight of Mo and the rest being V and unavoidable impurities.

3. The magnetic recording medium according to claim 1 or 2 wherein the amount of Mo is from 3 to 15% by weight and the amount of V is from 6 to 16% by weight.

4. The magnetic recording medium according to claim 1 or 2 wherein the magnetic recording layer has a coercive force of at most 600 Oe.

5. The magnetic recording medium according to claim 1 or 2 wherein the magnetic recording layer has a coercive force of from 300 to 600 Oe.

6. The magnetic recording medium according to claim 1 or 2 wherein the half value width Δθ50 of a X-ray reflection rocking curve from (002) plane of the magnetic recording layer is within a range of from 2.8° to 3.4°.

7. The magnetic recording medium according to claim 1 to 2 wherein the magnetic recording layer has a thickness of from 0.05 to 3 microns.

8. The magnetic recording medium according to claim 2 wherein the high magnetic permeability layer is made of a Mo-Fe-Ni alloy.

* * * * *